SEMICONDUCTOR DEVICE FABRICATION

Filed Oct. 27, 1960 2 Sheets-Sheet 1

INVENTORS.
THEODORE W. COOPER,
PRESTON V. CHENEY,
BY
Charles S. Haughey
ATTORNEY.

July 6, 1965 T. W. COOPER ETAL 3,193,418

SEMICONDUCTOR DEVICE FABRICATION

Filed Oct. 27, 1960 2 Sheets-Sheet 2

INVENTOR.
THEODORE W. COOPER,
PRESTON V. CHENEY,
BY
Charles J. Haughey
ATTORNEY.

United States Patent Office 3,193,418
Patented July 6, 1965

3,193,418

SEMICONDUCTOR DEVICE FABRICATION

Theodore W. Cooper, Santa Ana, and Preston V. Cheney, Costa Mesa, Calif., assignors by mesne assignments, to Fairchild Camera and Instrument Corporation, Syosset, N.Y., a corporation of Delaware Filed Oct. 27, 1960, Ser. No. 71,858
1 Claim. (Cl. 148—189)

Figure 1:
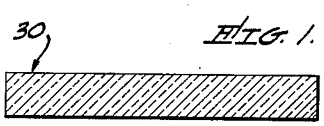

This invention relates to semiconductor device fabrication, and more particularly to an improvement in photochemical masking and subsequent fabrication of semiconductor devices.

In semiconductor device fabrication, it is desirable to produce sharply defined silicon oxide areas on the surface of a silicon crystal. Such areas may be used as masks for subsequent operations, such as in-diffusion of boron into monoxidized areas for doping purposes, or for formation of insulating oxide layers. Suitable silicon oxide layers may be formed by oxidizing the surface of silicon semiconductor crystals, or by decomposing chemicals, such as silanes, on a semiconductor such as silicon or germanium. It is presumed that such films are silicon dioxide, and its properties appear to be those of silicon dioxide; whether silicon monoxide is also present in such films is not known.

Defined areas of such silicon oxide films have been produced by masking portions of the films with special grease, solid masks such as rubber, and the like, and subsequently etching or dissolving away the exposed portion of the film to leave an oxide film conforming to the shape of the mask. Such film masking techniques are difficult to use, require great operator skill, are sources of contamination, and do not lend themselves to production of complicated patterns. Rubber masks particularly require pressure on the film surface, hence on the crystal, and both distort the mask and impose stresses on the crystal which tends to cause excessive breakage.

In the production of silicon semiconductor devices, such as PNP transistors, for example, silicon slices may be formed from P-type semiconductor crystals, indiffused with arsenic to form N-type surface regions, and then indiffused with boron to form a surface P-type region. It is is desirable in such transistors to mask a portion of the N-type surface region during diffusion of the P-type impurity, boron, so that the final structure will have both N and P type regions at the exposed surface for attachment of leads. A layer of silicon oxide may be used as a mask for the boron diffusion process, but the formation of such masks has heretofore presented many problems of contamination, registry of the mask, sharpness of edges of the silicon oxide film, special operator skills and the like. Selective etching of silicon oxide in the presence of silicon to produce a silicon oxide film mask has been very difficult, and has produced uneven quality and deterioration or removal of the desired silicon oxide mask.

Photosensitive polymerizable materials have been proposed as masks to produce patterns on silicon oxide films, so that a subsequent removal of unprotected silicon oxide will leave a silicon oxide pattern corresponding to that of the photosensitive polymerizable material. Such materials have produced incomplete protection to subsequent silicon oxide selective etchants. The edges of the silicon oxide films so produced are uneven and poorly defined, and often the entire silicon oxide film is attacked or completely removed due to physical separation of the protective mask. It thus appears that the adherence and sealing quality of such materials is unreliable for use with silicon oxide films.

It is an object and advantage of this invention to avoid the foregoing difficulties and to produce an effective and sharply defined silicon oxide area, or mask. For impurity diffusion into silicon, over 0.3 micron of silicon oxide film is generally required; on germanium over 0.15 micron is generally effective.

In accordance with the present invention, an improved masking technique covers an effective silicon oxide film or layer on a semiconductor crystal with an adherent metal film which is resistant to a silicon oxide etch (HF), and then covers the metal with a photosensitive polymerizable (PSP) material, exposes and develops the PSP material to polymerize the exposed portion and remove from the metal film the unpolymerized portion thereof, selectively removes the metal from the oxide in the areas where the unpolymerized PSP material was removed, and then selectively removes the silicon oxide from the areas where the unpolymerized PSP material was removed. The polymerized PSP material and the remaining portion of the metal film will ordinarily then be removed prior to subsequent operations such as indiffusion of boron or phosphorus into the portions of the silicon crystal from which the silicon oxide film was removed. The metal used is preferably germanium but may be chromium, nickel, cadmium, or alloys thereof such as nickel-chromium alloys. Germanium and chromium are generally preferred, although chromium is preferred when processing germanium semiconductors. Germanium is more readily and easily evaporated than chromium, its thermal expansion coefficient more nearly matches that of silicon, and it is more easily preferentially etched in the presence of silicon oxide and silicon. Both germanium and chromium have satisfactory adherence to silicon oxide and to the PSP material; have thermal expansion coefficients close enough to that of silicon to be useable as a film thereon; and are sufficiently resistant to the hydroflouric (HF) acid etchant used to preferentially remove silicon oxide from the silicon crystal. It has been observed that the germanium to silicon oxide bond is stronger than its bond to silicon, and thus is a very good bond for providing additional resistance to the silicon oxide film during etching thereof to form a pattern or mask of the silicon oxide on the silicon.

It is thus a further object and advantage of this invention to produce a superior silicon oxide pattern, or mask, on a semiconductor, such as silicon, base material utilizing photochemical techniques together with an intermediate metal film to protect the silicon oxide film during the preferential etching thereof to produce the desired pattern in the silicon oxide film. The above and other objects and advantages of this invention will be apparent from the balance of this specification, disclosing the preferred embodiment of this invention, and in the accompanying drawings and claim forming a part thereof, wherein:

FIGS. 1 to 10 illustrate a sequential process for producing a silicon oxide pattern on a silicon semiconductor crystal according to this invention; and FIGS. 11 to 21 illustrate a further stepwise process utilizing the silicon oxide film so produced in the production of silicon transistor crystal elements.

Figure 2:
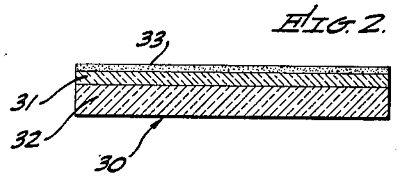

According to this invention as illustrated in the drawings, FIG. 1 shows a P-type silicon semiconductor crystal 30 upon which a silicon oxide mask is to be formed for selective diffusion of boron as a dopant, or electrical conductivity type determining impurity. Various cleaning and degreasing steps which are well known in semiconductor operations are omitted herein for clarity of presentation. The crystal 30 is subjected to an atmosphere of $As_2O_3$ in argon at about 1200° C., to indiffuse arsenic and form an N-type region 31 on the crystal surface. The balance of the crystal 30 will be a P-type region 32. The above atmosphere will simultaneously grow a silicon oxide film 33 on the crystal, hereinafter often referred to as an $SiO_2$ film, which is preferably enhanced by humidifying the gas to about a 30° C. dew point before the end of the diffusion step. If desired, oxygen gas may also be added to the atmosphere to promote formation of the $SiO_2$ film. The arsenic indiffusion step is preferably maintained for 4 to 6 hours, by way of example, to produce an N-type region of 4 to 6 microns depth and a surface $SiO_2$ film 33 of 0.3 to 1.0 micron thickness, preferably 0.4 to 0.6 micron, as shown in FIG. 2. Proportions have been exaggerated in the drawing for illustrative purposes.

Figure 3:
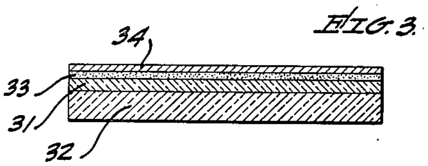

A germanium film 34 is next formed on the $SiO_2$ film by evaporation of germanium in a vacuum furnace. Films of from 0.15 to 9.0 microns have been used successfully, but 0.4 to 0.6 micron gives effective coverage and uniformity. This film is preferably formed by laying germanium on a tungsten filament, and heating the filament to evaporate the germanium in a vacuum of about $5 \times 10^{-5}$ mm. Hg to deposit the germanium on an exposed surface of the crystal at about 550° C. having the $SiO_2$ film thereon. FIG. 3 shows the resulting crystal 30 having an N-type region 31, a P-type region 32 for the balance of the crystal, an $SiO_2$ film 33 on the surface of the N-type region, and a germanium metal film 34 on the oxide film.

Figure 6:
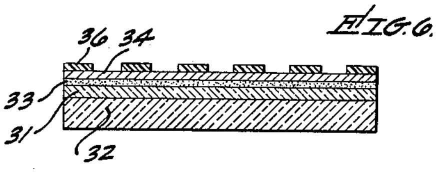
Figure 4:
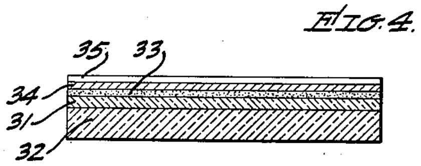
Figure 5:
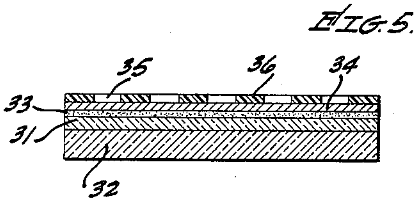

A film 35 of photosensitive polymerizable (PSP) material, such as polyvinyl alcohol, or a product well known on the market and sold under the trade name of Kodak Photo Resist by Eastman Kodak Company and believed to be a resinous ester of maleic anhydride and alkoxy hydroxy acetophenone, is next formed on the surface of the germanium, as shown in FIG. 4. The germanium is preferably lightly etched in a 4% hydrochloric acid etch for 30 seconds to remove any germanium oxide which may be present, and to improve adhesion thereto of the PSP material film. This film may be painted on, sprayed, or applied in any suitable way. The film 35 of PSP material is dried at about 70° C., then selectively exposed to ultraviolet light, preferably through a photographic film mask, to polymerize portions 36 of the film 35 which it is desired to retain as shown in FIG. 5. The crystal is then developed by rinsing with a solvent, such as methyl ethyl ketone trichloroethylene, or Kodak Photo Resist Developer sold by Eastman Kodak Company, for the unexposed, hence unpolymerized, PSP material, leaving areas, for example, stripes, of polymerized PSP material 36 as shown in FIG. 6. The crystal is then baked at 70° C. to further polymerize and harden the film portions 36.

Figure 7:
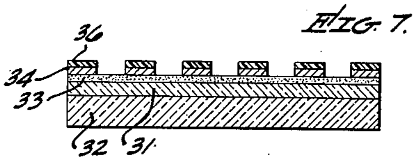

Exposed germanium between stripes of PSP material 36 is next etched and removed, in an etchant such as hydrogen peroxide and oxalic acid, to expose $SiO_2$ between the stripes of PSP material 36 as shown in FIG. 7. This etchant evolves relatively little gas when used below 40° C., and appears to have no substantial deleterious effect on the PSP material film.

Figure 8:
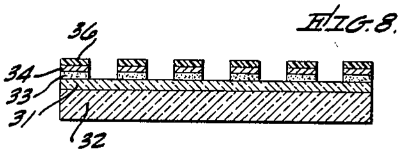

The exposed $SiO_2$ is next etched and removed by a hydrofluoric acid etch which selectively removes $SiO_2$ in the presence of silicon, germanium, and PSP material. FIG. 8 shows the resulting structure with alternate exposed areas of silicon crystal and stripes of layered PSP material, germanium and $SiO_2$.

Figure 9:
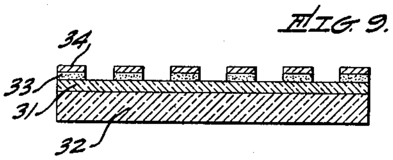

The PSP material 36 is next removed by softening with an appropriate solvent, such as methyl ethyl ketone, acetone, or trichloroethylene, and subsequent brushing, to expose the germanium film 34 in stripes as shown in FIG. 9. The crystal 30 is then subjected to a germanium solvent etch, such as hydrogen peroxide an oxalic acid, to expose the $SiO_2$ stripes on the crystal surface as shown in FIG. 10.

Figure 10:
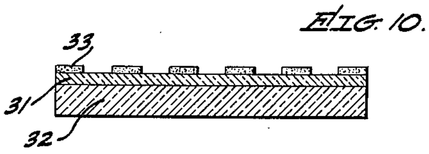
Figure 11:
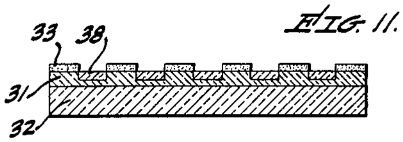

The production of the $SiO_2$ pattern, in stripes as illustrated in FIG. 10, without rough edges or undercutting of the $SiO_2$ and without loss of the oxide film in the body of the stripe, is the main objective of this invention. The $SiO_2$ pattern thus produced may be used in several alternative ways. By way of example, the further processing to produce mesa-type transistor crystal elements for transistor fabrication uses the above $SiO_2$ stripes as a mask in a boron diffusion process wherein the crystal surface is exposed to a boron containing gas such as boron oxide to diffuse boron into the crystal between the oxide stripes and convert the adjacent crystal region 38 to P conductivity type, as shown in FIG. 11.

Figure 12:
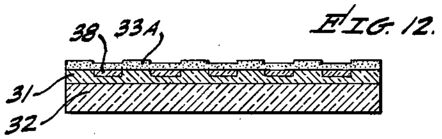

An additional oxide film 33A as shown in FIG. 12 is next grown over the entire crystal face, as by exposure to a 30° C. dew point argon atmosphere at about 900° C. In some cases, especially when the oxide film 33 was relatively thick, it may be preferable to remove the oxide stripes of that film before growing the new film 33A.

Figure 13:
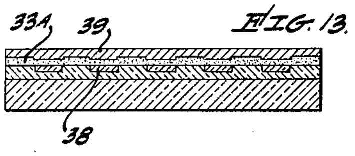
Figure 14:
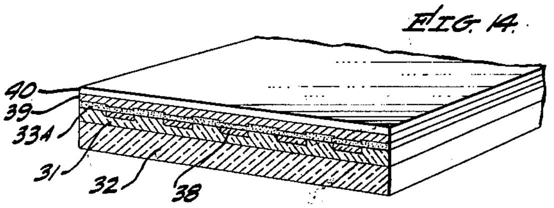

A film 39 of chromium as shown in FIG. 13 is then vapor deposited on the oxide film 33A on crystal, by vaporizing chromium from a tungsten filament in a vacuum furnace. The chromium film 39 is then covered with a film 40 of PSP material as shown in FIG. 14.

Figure 15:
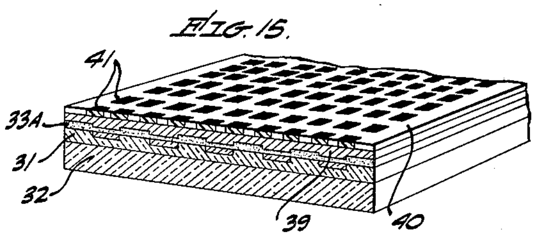

The PSP material of film 40 is next exposed to ultraviolet light through a photographic film mask positioned to expose and polymerize squares 41 bridging the junctions between the P-regions 38 and the N-regions 31 at the surface of the crystal, underlying the several films, as shown in FIG. 15. The PSP material of film 40 is then rinsed with a solvent for the unploymerized PSP material, such as methyl ethyl ketone, to remove unpolymerized PSP material and leave the pattern of square areas 41 of polymerized PSP material bridging the P and N regions of the crystal surface. The material of the squares 41 is then baked and hardened as with the previous film stripes 36.

Figure 16:
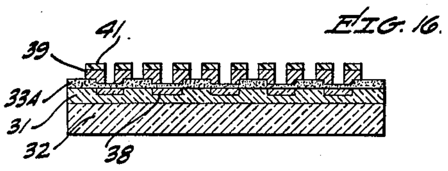

The chromium film now uncovered is next removed by a 70° to 80° C., 50% hydrochloric acid in water etchant to expose the $SiO_2$ film not covered by the squares 41, as shown in FIG. 16.

Figure 17:
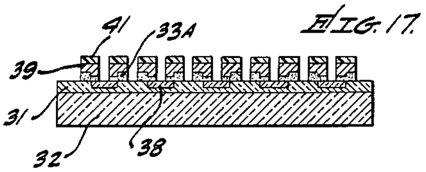
Figure 18:
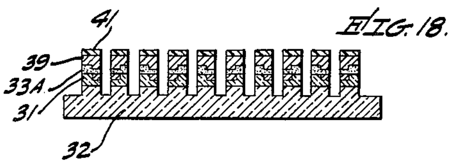

The $SiO_2$ film is then etched in HF to expose the silicon crystal not covered by the squares 41, as shown in FIG. 17, and the silicon crystal is then etched, with (1:1:2) solution of nitric acid, hydrofluoric acid and acetic acid, for example, to remove silicon crystal material down into the lower P-region, leaving mesas of crystal under each square 41, as shown in FIG. 18.

Figures 19, 20:
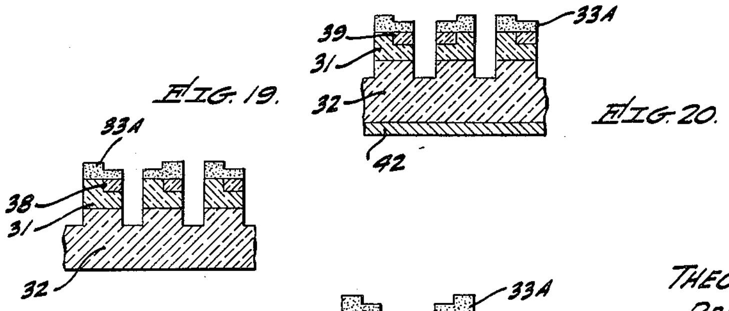
Figure 21:
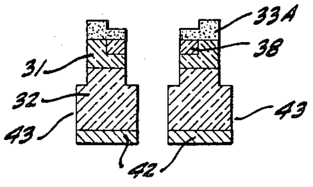

The square layers of polymerized PSP material and chromium, are next removed in successive etching operations utilizing a PSP material solvent such as trichloroethylene, with brushing of the softened PSP material, and a chromium solvent such as 37 to 39% HCl at 50° to 60° C. The resulting structure, shown in FIG. 19, is next provided with an ohmic contact on the reverse crystal face, as by fusing alminum 42 thereto as shown in FIG. 20 for subsequent attachment of a collector. The crystal is then sliced to separate out crystal elements 43 as shown in FIG. 21, each having a mesa structure thereon protected by an oxide film, for subsequent device fabrication by removal of the oxide film, attachment of leads and encapsulation.

The intermediate metal film 34 utilized in the process steps illustrated in FIGS. 1–10 to protect the $SiO_2$ film under the PSP material during selective removal of the $SiO_2$ film, illustrated as a germanium film, thus provides sharper delineation of the oxide mask or film areas under the polymerized PSP material, and the use thereof has sharply reduced finished device rejects in silicon transistor manufacture, due to etching of the $SiO_2$ film 33, from as high as 40% without the germanium film to less than ½% with the germanium intermediate film. As will be apparent, a chromium metal film could be used in the place of the germanium film 34 herein illustrated, with suitable adjustments in the process such as the use of chromium solvents, or etches, for chromium removal, or cadmium, nickel, or alloys of the above metals may be used as intermediate metal films as taught herein. The metal film requires a sufficient resistance to hydrofluoric acid used to etch the silicon oxide film to protect the oxide thereunder, and a good adherence to the oxide and to the PSP material. A metal etch should also be utilized for metal removal which evolves a minimum of gas, and accordingly has little tendency to disturb the PSP material film during the etching process.

Although the example illustrated herein is a process for producing a PNP transistor, the process is well suited for production of diodes or other semiconductor junction devices. To produce diodes an original N-type crystal 30 may be used, and the resulting structure will correspond to that shown in the drawings except that the N-type region 31 would extend through the region 32 in the drawings. The advantages of the process as described, particularly in producing well defined and complicated silicon oxide masking films and the resultant precisely formed P-N junctions when such films are used as diffusion masks, will accrue to a wide variety of junction semiconductor devices.

We claim:

In the process of fabricating a semiconductor device by the diffusion of a conductivity-type-determining impurity into selected portions of a semiconductor body through openings in a silicon oxide coating on said semiconductor body, the improvement comprising:

(1) forming a silicon oxide coating on a surface of said silicon semiconductor body by thermal oxidation;

(2) depositing from a vapor on said oxide coating an adherent film of metal selected from the class comprising germanium, chromium, cadimum, nickel and alloys thereof, said film having a thermal coefficient matched to said body;

(3) forming a film of photo-sensitive polymerizable material on said metal film;

(4) exposing, developing, and selectively removing undeveloped portions of said photo-sensitive polymerizable material to expose selected areas of said metal film to expose selected areas of said oxide film;

(5) removing said exposed areas of said metal film to expose selected areas of said oxide film;

(6) removing the entire thickness of the oxide film underlying said exposed areas of said oxide film to expose a selected surface portion of said semiconductor body;

(7) and thereafter subjecting said exposed surface portion of said semiconductor body to an atmosphere containing said conductivity-type-determining impurity to thereby diffuse said impurity into selected portions only of said semiconductor body.

References Cited by the Examiner

UNITED STATES PATENTS

| | | | |
|---|---|---|---|
| 1,922,434 | 8/33 | Gundlach. | |
| 2,215,128 | 9/40 | Meulendyke | 95—5.7 |
| 2,666,008 | 1/54 | Enslein et al. | 41—43 X |
| 2,802,760 | 8/57 | Derick et al. | 148—1.5 |
| 2,878,147 | 3/59 | Beale | 148—1.5 |
| 2,900,580 | 8/59 | Beck | 317—101 |
| 2,911,539 | 11/59 | Tanenbaum | 148—1.5 X |
| 2,946,683 | 7/60 | Mellan et al. | 117—34 X |
| 2,967,766 | 1/61 | Witmore et al. | 156—14 X |
| 2,977,227 | 3/61 | Demaria | 156—14 X |
| 2,977,252 | 3/61 | Causse et al. | 117—34 X |
| 2,981,877 | 4/61 | Noyce | 307—101 |
| 3,012,920 | 12/61 | Christensen et al. | 156—11 |
| 3,025,589 | 3/62 | Hoerni | 29—25.3 |
| 3,064,167 | 11/62 | Hoerni | 317—235 |

OTHER REFERENCES

Manfield: "Using Thin Films in Microminiaturization," Electronic Design, January 21, 1959, vol. 7, No. 2, pp. 38, 39, and 40.

Swiggett et al.: "The Economics of Printed Wiring," Tele-Tech and Electronic Industries, December 1953, pp. 78, 79 and 80.

JOHN W. HUCKERT, *Primary Examiner.*

MARCUS U. LYON, DAVID RECK, GEORGE N. WESTBY, DAVID J. GALVIN, *Examiners.*